US011931838B2

(12) United States Patent
Hudson et al.

(10) Patent No.: US 11,931,838 B2
(45) Date of Patent: Mar. 19, 2024

(54) MACHINES, SYSTEMS, AND METHODS FOR AUTOMATED TRUSS ASSEMBLY AND CRIMPING

(71) Applicant: Ojjo, Inc., San Rafael, CA (US)

(72) Inventors: Tyrus Hudson, Petaluma, CA (US); Greg McPheeters, Santa Cruz, CA (US); Charles Almy, Berkeley, CA (US)

(73) Assignee: Ojjo, Inc., San Rafael, CA (US)

( * ) Notice: Subject to any disclaimer, the term of this patent is extended or adjusted under 35 U.S.C. 154(b) by 0 days.

(21) Appl. No.: 18/119,120

(22) Filed: Mar. 8, 2023

(65) Prior Publication Data

US 2023/0219182 A1    Jul. 13, 2023

Related U.S. Application Data

(62) Division of application No. 17/095,616, filed on Nov. 11, 2020, now Pat. No. 11,628,525.

(60) Provisional application No. 62/960,368, filed on Jan. 13, 2020, provisional application No. 62/933,896, filed on Nov. 11, 2019.

(51) Int. Cl.
| | |
|---|---|
| *E02D 7/14* | (2006.01) |
| *B23P 19/10* | (2006.01) |
| *E02D 5/80* | (2006.01) |
| *E02D 7/22* | (2006.01) |
| *E02D 13/04* | (2006.01) |
| *H02S 20/32* | (2014.01) |
| *E02D 13/00* | (2006.01) |

(52) U.S. Cl.
CPC .............. *B23P 19/10* (2013.01); *E02D 5/801* (2013.01); *E02D 7/14* (2013.01); *E02D 7/22* (2013.01); *H02S 20/32* (2014.12); *E02D 13/00* (2013.01)

(58) Field of Classification Search
CPC .. E02D 5/56; E02D 5/801; E02D 7/06; E02D 7/14; E02D 7/22; E02D 7/26; E02D 13/00; B23P 19/10; H02S 20/32
See application file for complete search history.

(56) References Cited

FOREIGN PATENT DOCUMENTS

WO    WO-2012010133 A2 *  1/2012  ............... E02D 7/10

\* cited by examiner

*Primary Examiner* — Benjamin F Fiorello
*Assistant Examiner* — Stacy N Lawson
(74) *Attorney, Agent, or Firm* — Phillip D. Mancini

(57) ABSTRACT

An alignment and installation jig for a screw anchor driving machine. The alignment and installation jig includes a laser target that can be moved from an alignment position to a driving position. The jig may also include one or more automated crimping assemblies to form permanent connections between overlapping foundation components while the machine is correctly oriented to assembly a truss foundation. One crimping assembly device may effect crimp joints between a foundation component held by the jig and overlapping upper ends of a pair of adjacent foundation legs. Second crimping assemblies may telescope down each leg to effect respective crimp joints between the lower end of the leg and the upper end of a driven foundation component.

6 Claims, 17 Drawing Sheets

MACHINES, SYSTEMS, AND METHODS FOR AUTOMATED TRUSS ASSEMBLY AND CRIMPING

CROSS-REFERENCE TO RELATED APPLICATIONS

This is a divisional of U.S. utility patent application Ser. No. 17/095,616, filed on Nov. 11, 2020, titled "DEVICES, MACHINES, AND SYSTEMS FOR AUTOMATED TRUSS ASSEMBLY AND CRIMPING," now U.S. Pat. No. 11,628,525, which claims priority to U.S. provisional patent application No. 62/960,368 filed on Jan. 13, 2020, titled "ALIGNMENT AND ASSEMBLY ASSIST DEVICES FOR SCREW ANCHOR DRIVING MACHINE," and 62/933,896 filed on Nov. 11, 2019, titled "DUAL CRIMPING DEVICE FOR CONSTRUCTING TRUSS FOUNDATIONS", the disclosures of which are all hereby incorporated by reference in their entirety.

BACKGROUND

The applicant of this disclosure has developed a new foundation system for supporting single-axis trackers known commercially as the EARTH TRUSS. Until recently, single-axis trackers were supported by H-pile foundations. H-piles are galvanized steel !-beams driven into the ground with a percussive or vibratory pile driver along each intended tracker row. EARTH TRUSS seeks to upset this paradigm with a multi-piece truss foundation that relies on a pair of truss legs joined together at the top with an adapter or truss cap that unitizes the structure. Bearing assemblies, torque tubes and other components are supported by the truss cap. Each leg consists of a threaded screw anchor portion and an upper leg portion, joined via a driving coupler at the upper end of the screw anchor. This design allows less steel and shallower embedment depths to be used to support the same weight by converting lateral loads into axial forces of tension and compression.

One reason H-piles have dominated the market for tracker foundations is their simplicity. H-piles make a one-piece foundation, requiring and layout and pile driving as the only installation steps. By contrast EARTH TRUSS involves five components that must be assembled at each foundation location. Even though the system uses less steel than a comparable H-pile foundation, to achieve its maximum potential, it must not sacrifice those gains with a significantly longer or more complicated installation process. To that end, various embodiments of this disclosure seek to provide systems, assemblies, and devices integrated into a screw anchor driving machine for reducing the time and complexity of EARTH TRUSS assembly while achieving the requisite accuracy needed to support a tracker torque tube.

DETAILED DESCRIPTION

The following description is intended to convey a thorough understanding of the embodiments described by providing a number of specific embodiments and details involving A-frame foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

As discussed above, the applicant of this disclosure has developed a novel A-frame-shaped truss foundation for supporting single-axis solar trackers and other structures that relies on a pair of angled legs joined together with an adapter, truss cap or other structure that in turn supports a bearing assembly, motor, or other tracker component. The legs of the foundation are formed by driving a pair of adjacent screw anchors into supporting ground so as to straddle an intended North-South line of a tracker row. Once each anchor is driven to its target embedment depth, upper legs are loosely sleeved over their respective screw anchors to complete the legs. Connecting portions of the truss cap or adapter are inserted into the upper end of each leg to form the truss. Wobble afforded by this loose connection allows the truss cap to be precisely aligned before locking the components in place. Then, a jig, clamp, or other device that is also attached directly or indirectly to the mast of the machine holds the adapter or truss cap in place at the correct height, East-West alignment, pitch, roll and yaw above the screw anchors. With this fixed geometry, crimp joints may then be made where each upper leg overlaps with its screw anchor and respective connecting portion of the truss cap. It should be appreciated that other means of joining these components may be utilized, including, for example, mechanical fasteners, clamps, or other suitable connectors.

Figure 1:
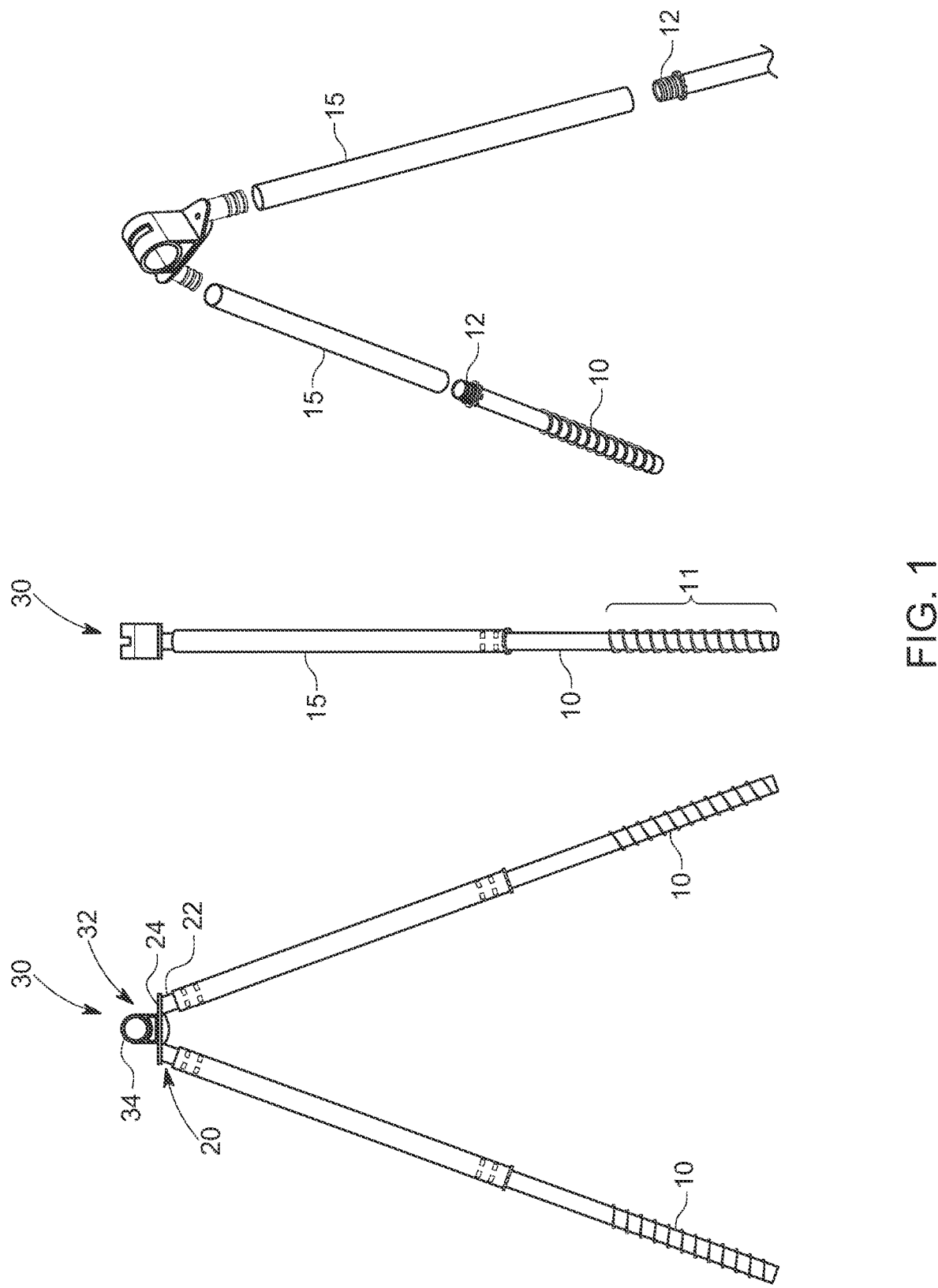
FIG. 1 shows different views of a truss foundation supporting a portion of a single-axis tracker according to various embodiments of the invention.
Figure 2:
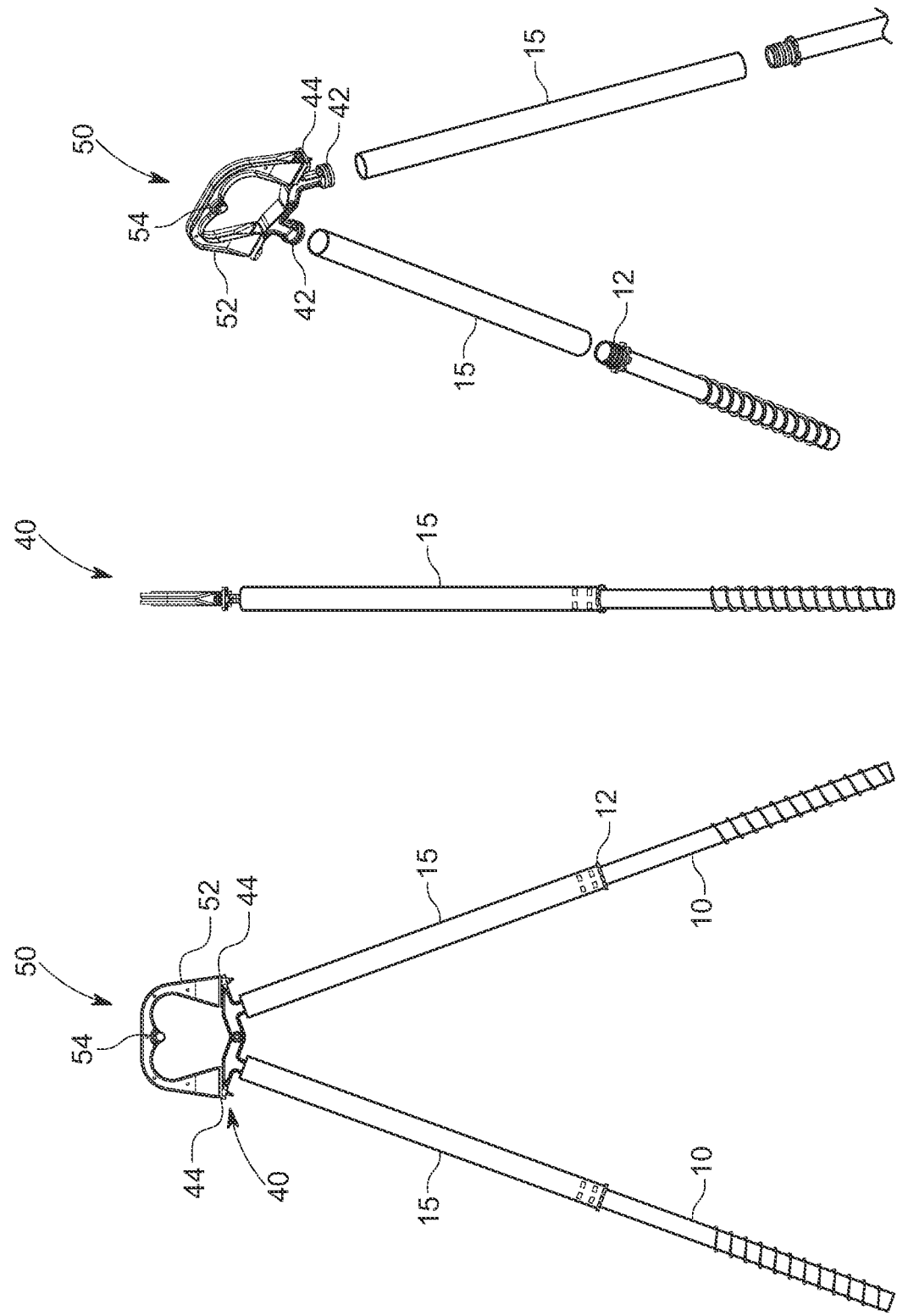
FIG. 2 shows different views of a truss foundation supporting a portion of another single-axis tracker according to various embodiments of the invention.

FIGS. 1 and 2 show two variants of the above-described EARTH TRUSS foundation. In both cases, a pair of screw anchors have been driven into the ground at angles to one another and spaced apart to point at a common work point. The work point represents the point in space where a line through the center axis of each screw anchor intersects. When lateral loads dominate, this is the ideal place on the truss to orient the rotational axis. When moment loads dominate, the rotational axis is more ideally located below the work point. In a single-axis tracker, the intersection between rotating parts and non-rotating parts is where loads are translated into the fixed foundation.

The base component of each truss foundation is screw anchor 10. Screw anchor 10 is a hollow, elongated member with external thread form 11 at the lower end and driving coupler 12 at the upper end. By being hollow at both ends, a drill, mandrel or other tool may be actuated through the screw anchor to assist the rotary driver with driving the screw anchor into difficult soils. Driving coupler 12 at the upper end of screw anchor 10 provides driving features that are engaged by the chuck of a rotary driver as well as a mounting post or coupling 13 that is received into one of the upper legs. In various embodiments, upper leg sections 15 are loosely sleeved over one of the connecting portions of the truss cap and then lowered down over coupling 13 to rest against the driving features of couple 12. This loose fit allows for some adjustment of the upper leg component relative to the truss cap. The truss cap in turn dictates the alignment of the bearing assembly.

Truss cap 20 shown in FIG. 1 is optimized to support a conventional bearing assembly 30, such as, in this example, one from an Array Technology, Inc. of Albuquerque, NM, where the torque tube is captured within a bearing and rotates in the bearing about its own axis. Bearing assembly 30 consists of housing 32 with bearing opening 34. Housing 32 sits on mounting surface 24 of truss cap 20. A torque tube (not shown) is received within bearing opening 34. By contrast, in FIG. 2, truss cap 40 has been optimized to support a mechanically balanced single-axis tracker such as that sold by NEXTracker, Inc. of Fremont, California. In such a tracker, bearing housing assembly 50 sits on support portions 44 of truss cap 40. Bearing assembly 50 has a main body portion 52 that defines a cardioid-shaped opening. The torque tube is suspended from a bearing pin seated in bearing 54. The drive motor in this tracker causes the torque tube to swing through an arc bounded by main body portion 52. In either the case of truss cap 20 and bearing assembly 30 or truss cap 40 and bearing assembly 50, correct orientation of screw anchors 10 and alignment of truss caps 20/40 are important to insure that tracker components attached to each foundation in a row are properly aligned with one other and within tolerances permitted by the tracker maker.

Although this alignment may be achieved using manual control of the installation machine, throughput, accuracy, repeatability, and reproducibility will be maximized by relying on machine automation techniques.

Figure 3:
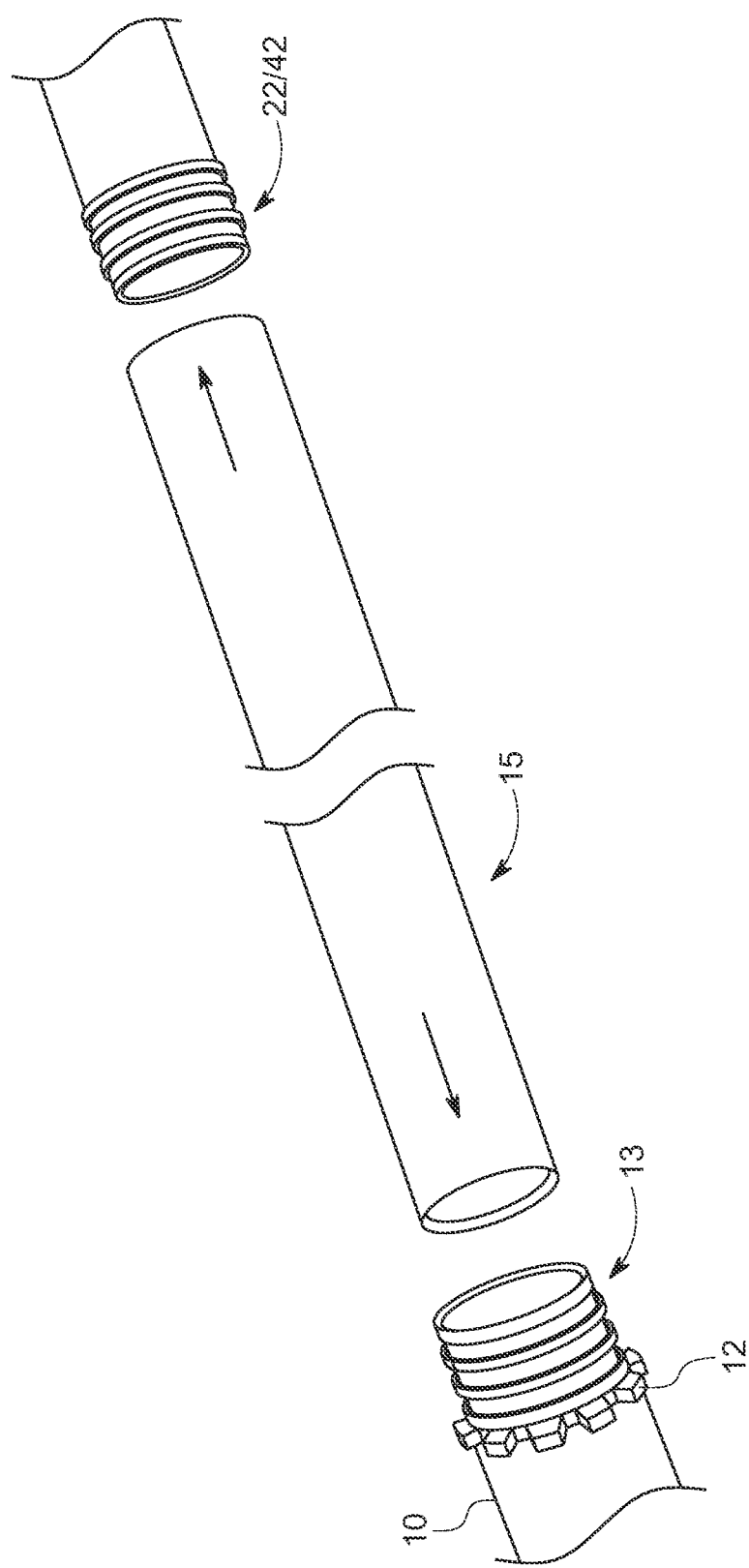
FIG. 3 shows overlapping portions of connectors for joining truss legs to other truss structures according to various embodiments of the invention.

FIG. 3 shows the fitment between upper leg sections 15 and coupling 13 of driving coupler 12 and connecting portion 22/42 corresponding to truss caps 20 or 40. As discussed in greater detail herein, once the pair of adjacent screw anchor have been driven at the correct location, the machine reverts to an alignment orientation so that the truss cap can be held in place at the correct position to insure positional uniformity of the bearing or bearing housing assembly. An upper leg section such as section 15 is then sleeved up over connecting portion 22/42 and then back down onto coupling 13 of driving coupler 12. Slop between these overlapping areas enable upper leg 15 to unify truss cap 22/42 to legs 10 while correcting for any misalignment between the screw anchors' respective driving axes and their intended axes. In various embodiments, a crimping device is placed over upper leg 15 at the areas of overlap between the upper leg and coupling 13 and one of connecting portions 22/42. As the crimper applies pressure to the surface of upper leg 15, jaws in the crimper deform the upper leg into recesses formed in coupling 13 and connecting portions 22/42, preserving the orientation of truss cap 20/40 relative to screw anchors 10.

Figure 4A:
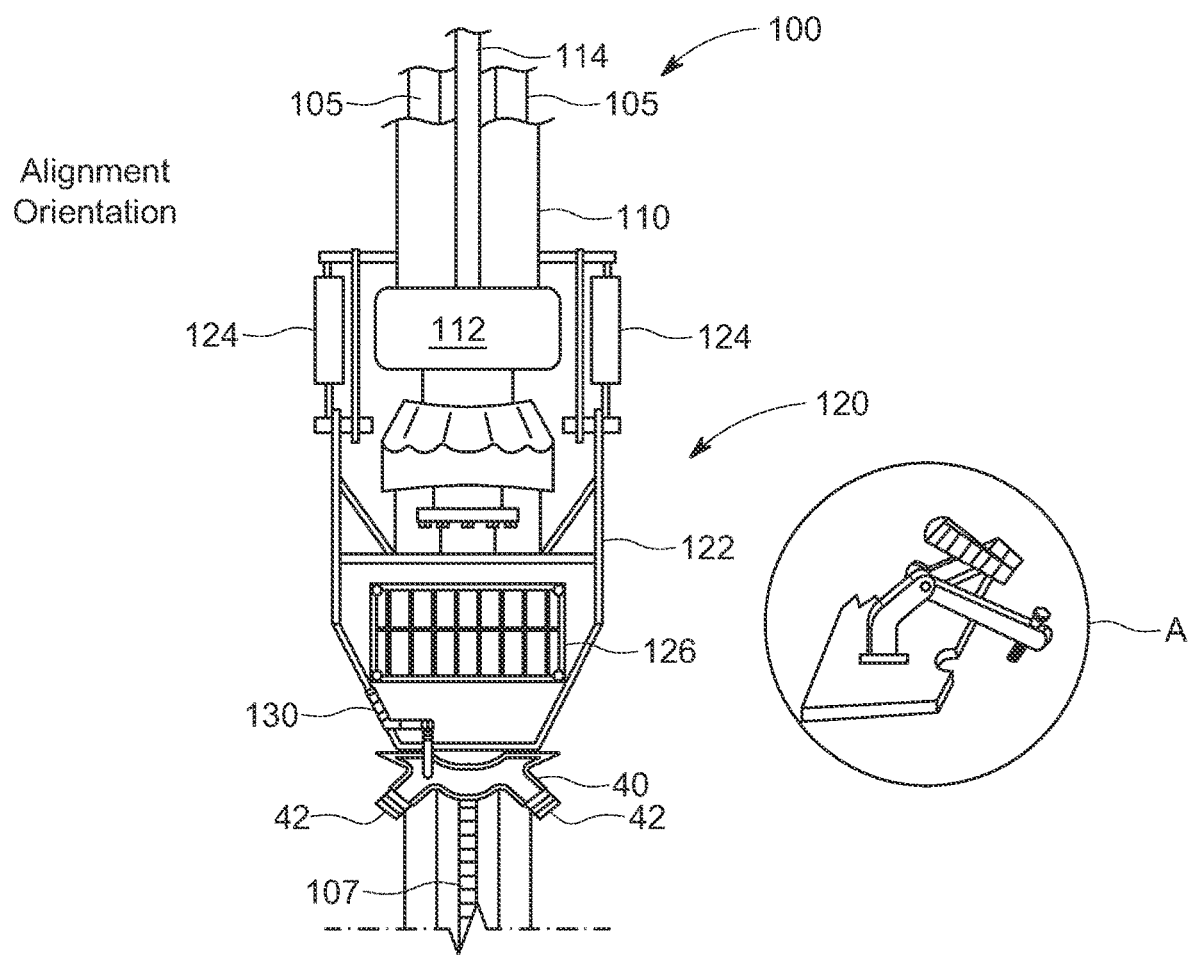
FIG. 4A shows a portion of a mast of a machine for driving foundation components and aligning and assembling trusses according to various embodiments of the invention.

Turning now to FIG. 4A, this figure shows a portion of accessory mast 100 of a screw anchor driving machine according to various embodiments of the invention. The machine itself has been intentionally omitted but may take the form of a piece of tracked heavy equipment with an articulating connection to an accessory mast. Exemplary machines may be seen, for example, in commonly assigned application Ser. No. 16/416,052, "Threaded truss foundations and related systems, methods, and machines," hereby incorporated by reference in its entirety. Mast 100 is an elongated boxed or beam-like structure that extends in front of or behind the machine and is preferably able to move with respect to the machine in at least Z, pitch, roll, and yaw and also, in some embodiments, in Y (East to West) and X (North to South), to enable the mast and its corresponding screw anchor driving axis to be aligned with the desired location of truss foundation components to insure that each truss foundation in a given tracker row supports the torque tube at the desired orientation. On level ground, this may mean supporting it to be level and at the same height. On other terrain, this may mean remaining orthogonal to the torque tube and maintaining the tube along a continuous, substantially straight axis.

Mast 100 shown here consists of a pair of tracks or rails 105 running substantially the entire length on either side of its length. Lower crowd or carriage 110 rides along tracks 105 to move up and down mast 100 motivated by chain 107 that is attached to a lower crowd motor (not shown) or other suitable motive source. In various embodiments, the lower crowd motor may be located behind mast 100 (i.e., on the side of the mast facing the machine) or otherwise concealed within the mast so as not to interfere with the movement of lower crowd 110 along the mast's driving axis. In various embodiments, and as shown in the drawings, rotary driver 112 is attached to lower crowd 110. Rotary driver 112 is a hydraulically powered unit with an output chuck that receives a driving collar of screw anchor 10 and transfers torque to the anchor via the chuck to rotate it into the ground. In various embodiments, at the same time as rotary driver 112 applies torque, the lower crowd motor pulls on chain 107 to transfer downforce to the screw anchor via lower crowd 110 since rotary driver 112 is attached to lower crowd 110. In various embodiments, the combination of torque and downforce are optimized via automated closed-loop feedback control to drive screw anchors at the maximum speed without augering.

Though not shown entirely in the figure, a tool driver, such as a hydraulic drifter or other drilling tool is also positioned on mast 100 on a separate upper crowd or carriage so that its shaft, shaft 114, passes through rotary driver 112 as well as through an attached screw anchor when driving. In various embodiments, this upper crowd or carriage is also coupled to chain 107 and therefore movable up and down mast 100 by the lower crowd motor at the same rate as lower crowd 110. However, unlike lower crowd 110, in various embodiments, the upper crowd is selectively detachable from chain 107 and movable by a separate drift motor that enables the hydraulic drifter to control tool shaft 114 to move at a different feed and speed than the feed and speed of rotary driver 112.

In various embodiments, installation of screw anchors and assembly of EARTH TRUSS foundation using mast 100 is accomplished as follows. The machine is tracked to the start or end of an intended tracker row. One or more GPS or local positioning systems may be used to approximately orient the machine on the row. Then, one or more laser devices positioned to face the mast may be used to locate the machine and/or mast in X, Y, Z, and yaw. In various embodiments, mast pitch and roll corrections are made automatically from uploaded data or real-time inclinometer readings.

There are two opportunities for automated orientation when installing the EARTH TRUSS system to insure that subsequent tracker components are in alignment with other components in the same row. In the first, mast 100, and by extension, the drive axis, are aligned to achieve locational consistency with other foundations in the row. The drive axis is the path that will be traveled by the screw anchor and tool (e.g., mandrel, drill, etc.) along the mast as the anchor is driven into the ground. In various embodiments, a laser is placed at one end of the row to face the mast. Its beam will impinge on a target positioned on the mast so that visual confirmation of alignment may be made by an operator. Using a remote control or other user interface, the operator may feather the mast into alignment with small adjustments in Y, Z, and yaw, among others. In various embodiments, the laser may be aligned with the intended rotational axis of the tracker. This alignment step involves aligning in Y (left to right), Z (up and down), pitch, roll and yaw. Once that alignment has been achieved, the positions of one or more linear and rotary encoders are latched so that the machine can be oriented to the correct driving angle to drive a first screw anchor, return to a neutral position for reloading, and oriented to the second driving angle to drive the second screw anchor.

After a pair of adjacent screw anchors have been driven on either side of the intended North-South line of the tracker row, and rotary driver 112 and tool shaft 114 withdrawn up the mast, the truss needs to be assembled, requiring a second alignment step. In some embodiments, the mast may simply return to the previously latched position and the lower crowd returned to the correct position on the mast. Alternatively, if necessary, a second visual check may be performed with the laser and target to confirm alignment to correct for any machine or mast movement that may have occurred during driving that would not be measured by the encoders. Once complete, an adapter or so-called truss cap 40 is placed on the mast and held in place with a jig or clamp 130 in FIG. 4A, at the orientation that insures that the tracker's rotational axis, dictated by the bearing adapter or bearing assembly attached to the truss cap, will be at the desired location and substantially aligned with the rotational axis of each other bearing adapter or bearing assembly in the row. It should be appreciated, that although truss cap 40 from FIG. 2 is shown in FIG. 4A, that truss cap 20 or other truss caps, adapters, or bearing adapters may be substituted. Also, the term "jig" is used in the disclosure and claims generally to refer to a clamp, guide(s), or other structure used to temporarily hold or position the truss cap on the mast for assembly. The position and distance from truss cap 40 to the intended rotational axis is dependent on the particular single-axis tracker that will be installed but is known for each tracker beforehand. In various embodiments, mast 100 and crowd 110 are automatically positioned above the pair of driven screw anchors 10 so that truss cap 40 is held at the correct position. Then a pair of upper legs 15 are sleeved over connecting portions 42 so that the legs may be connected to truss cap 40 and to screw anchors 10.

It important that both alignment steps are performed while the machine remains at the same place because a reference position has already been calculated and all deviations from that known reference during screw anchor driving operations may be measured. Once the machine is moved, a new reference will have to be established to enable precise positioning of truss cap 40. In recognition of that problem, various embodiments of the invention provide a movable frame assembly that includes at least a laser target and a jig for holding a truss cap or other apex foundation component. In various embodiments that frame assembly is movable from an alignment position, used for aligning the mast as well as the truss cap and to a driving position where target 126 and truss cap jig 130 are moved out of the path of the rotary driver's driving axis.

Figure 4B:
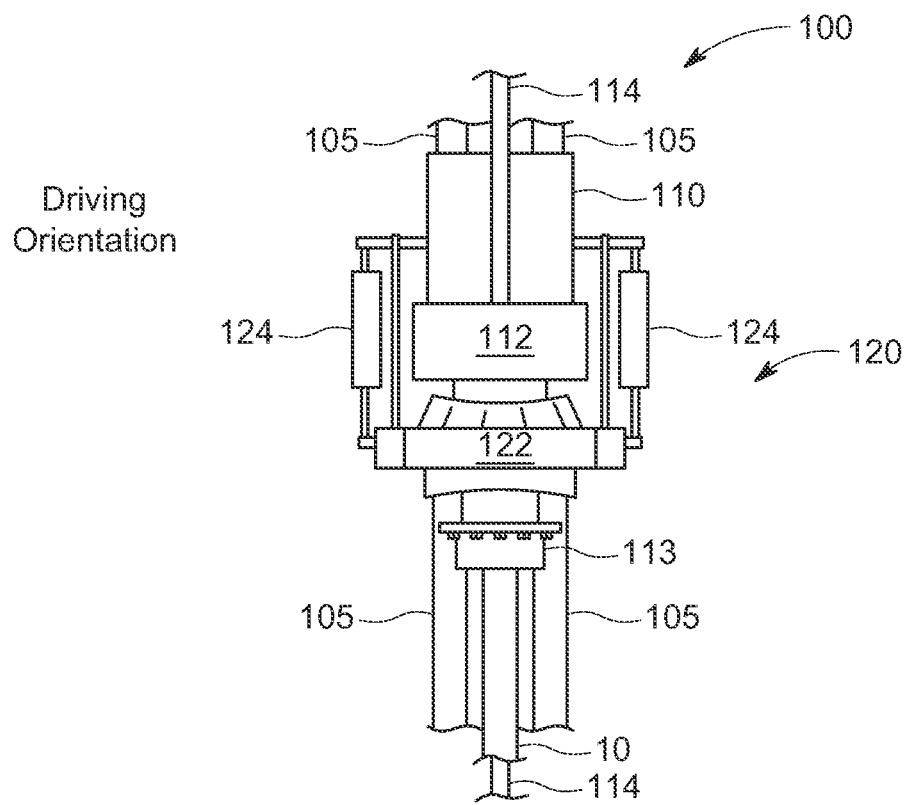
FIG. 4B shows a portion of the mast of the machine for driving foundation components and aligning and assembling trusses shown in FIG. 4A according to various embodiments of the invention.

Such a movable frame assembly is shown, for example, in FIGS. 4A and B as element 120. In various embodiments, frame assembly 120 includes is movably attached to lower crowd 110 so as to move up and down mast 100 with crowd 110. Frame assembly 120 includes hinged portion 122 movable via actuators 124 attached to lower crowd 110 to enable target portion 126 to be changed from an alignment orientation, as shown, for example, in FIG. 4A, where target portion 126 is substantially parallel to the driving axis, to a driving orientation, as shown, for example, in FIG. 4B where it substantially perpendicular to it. Laser target 126, attached to hinged portion 122, is made of two superimposed portions, a front one and a back one, that are spaced apart with markings on both so that when the laser impinges on the target, an operator is able to visually detect whether the mast is aligned in Y (East-West) and Z (vertically) and in yaw. In various embodiments, pitch and roll adjustments are made automatically based on inclinometer readings. Using one or more buttons on a remote control or other physical user interface, the operator is able to make actuators 124 withdraw, causing the hinged portion 122 of frame assembly 120 to move down into the alignment orientation, as in 4A. Then, small adjustments in Y, Z and yaw may be made by the operator to achieve the correct alignment based on feedback of the laser beam impinging on the target. In addition, X-axis adjustment, that is, positional adjustment along the North-South oriented tracker row, may be made manually or automatically with the assistance of one or more range finding lasers that measure the target distance relative to a known position and compare that to the predetermined distance for the current foundation. After alignment is complete, the operator may commence the next step of loading a screw anchor which may automatically energize actuators 124 to extend causing frame assembly 122 to pivot to an orientation that is substantially perpendicular to mast 100 and out of the way of rotary driver 112's driving axis. This is seen, for example, in FIG. 4B.

When looking directly at mast 110 in 4B, hinged portion 122 of frame assembly 120 has a much smaller cross section at the driving orientation because at the driving orientation, it is substantially perpendicular to mast 100. At this orientation, rotary driver 112 has an unobstructed path to travel along mast rails 105 so that screw anchor 10 may be loaded onto chuck 113 of rotary driver 112 and driven into the ground. It should be appreciated that although mast 100 is shown as oriented vertically in 4B, when actually driving a screw anchor, it will typically be angled to the left or the right since screw anchor are typically not driven plumb. In various embodiments, once the first screw of the adjacent truss pair has been driven successfully to the desired embedment depth, the lower crowd motor is actuated to pull lower crowd 110 and the upper crowd up mast 100 until tool shaft 114 has cleared the above-ground end of the driven screw anchor. In various embodiments, lower crowd 110 will be withdrawn partially while upper crowd may be withdrawn further up the mast so that tool shaft 114 is out the way so that a second screw anchor may be loaded. The driving process is then repeated for the second screw anchor of the adjacent pair.

Once the second screw anchor has been successfully driven to the desired embedment depth, the lower crowd motor once again moves lower crowd 110 back up mast 100 until it has returned to the previously latched orientation position. The upper crowd motor may continue to move the upper crowd and driver further up the mast so that it is completely out of the way for the second alignment and truss assembly step. Actuators 124 are energized to cause frame assembly 122 to return to the alignment orientation, extending below rotary driver 112. After visual confirmation of alignment via laser impingement on target 126, a TRUSS CAP or other adapter, such as TRUSS CAP 40 may be placed on hinged portion 120 and temporarily locked down with clamp assembly 130. In various embodiments, clamp assembly 130 includes one or more positioning jigs, posts, or guides that insure that truss cap 40 is in the correct location. Then, an upper leg may be slide over each connecting portion 42 of truss cap and down over one of the driving couplers at the upper end of each screw anchor. In various embodiments, connecting portions 42 are long enough to enable upper legs 15 to be sleeved over them and then lowered down to sleeve over driving coupler 12 (see, e.g., FIG. 3). After the loose-fitting connection between screw anchors 10 and upper legs 15, and between upper legs 15 and truss cap 40, have been made, a crimping device is used to lock the components together at this orientation. In various embodiments, four crimp joints are made. This may be done with a manual crimping device attached to the mast or the machine or held separately, or, alternatively, with an automated mast-mounted crimping device, as discussed in greater detail herein. Once installation is complete, clamping jig 130 is released, and the machine may simply be moved away to the next foundation location leaving behind the completely assembled and free-standing EARTH TRUSS foundation 55, as seen, for example, in FIG. 7.

Turning now to FIGS. 5A-D and 6A-C, these figures show another frame assembly 150 for mast 100 of a screw anchor driving machine including automated crimpers according to various other embodiments of the invention. Starting with FIGS. 5A and B, these figures show a front view of a portion of mast 100 supporting movable frame assembly 150 according to various embodiments of the invention. Due to the number of components occupying the space in front of lower crowd 110, in FIG. 5A, target portion 170 has been removed from frame assembly 150. As in the embodiment of FIG. 4A/B, assembly 150 is attached to the outer edges of lower crowd 110 so as not to interfere with the movement of rotary driver 112 or tool shaft 114. In this example, assembly 150 is attached via a four-bar linkage consisting of bent bars 153, straight bars 155 and actuators 156. When actuators are extended, assembly 150 moves into the alignment position as shown in 5A, B and D, where the target is down, obscuring rotary driver 112. At this position, target 170 attached to assembly 150 can be used to properly orient the mast, in Y, Z, and yaw. After that, and after level correction (pitch and roll) and X-axis positioning have been achieved, actuators 156 are energized to retract, thereby pulling down on straight bars 155 causing the entire assembly 150 to move into the driving position, as shown, for example, in FIG. 5C. In this position, assembly 150 is still substantially parallel to mast 100 but is out of the way of driving axis so that a screw anchor may be loaded onto rotary driver 112 and driven into the ground. Note that target 170 has been removed from 5A and 5C to enable other elements to be visible and to make room for element labeling. In actual use, target 170 remains attached to assembly 150 as seen in 5D. After the pair of adjacent screw anchors have been driven to the desired embedment depth, lower crowd 110 is again moved up mast 100 to return to the height it was at when properly oriented. Then, assembly 150 is moved back to the alignment position, such as that shown in 5D by energizing actuators 156. As discussed above, one or more lasers may be again illuminated on target 170 to confirm that the machine or mast did not move relative to its pre-driving position.

Figure 5A:
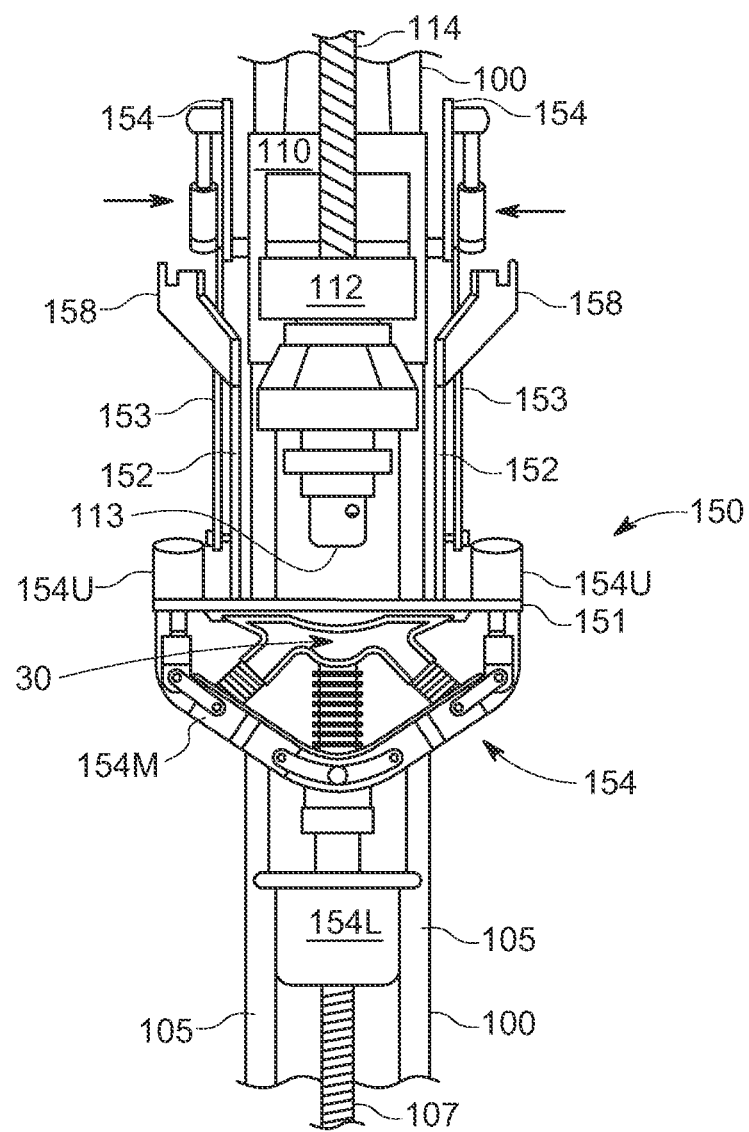
FIG. 5A shows a portion of a mast of another machine for driving foundation components and aligning and assembling trusses according to various embodiments of the invention.
Figure 5B:
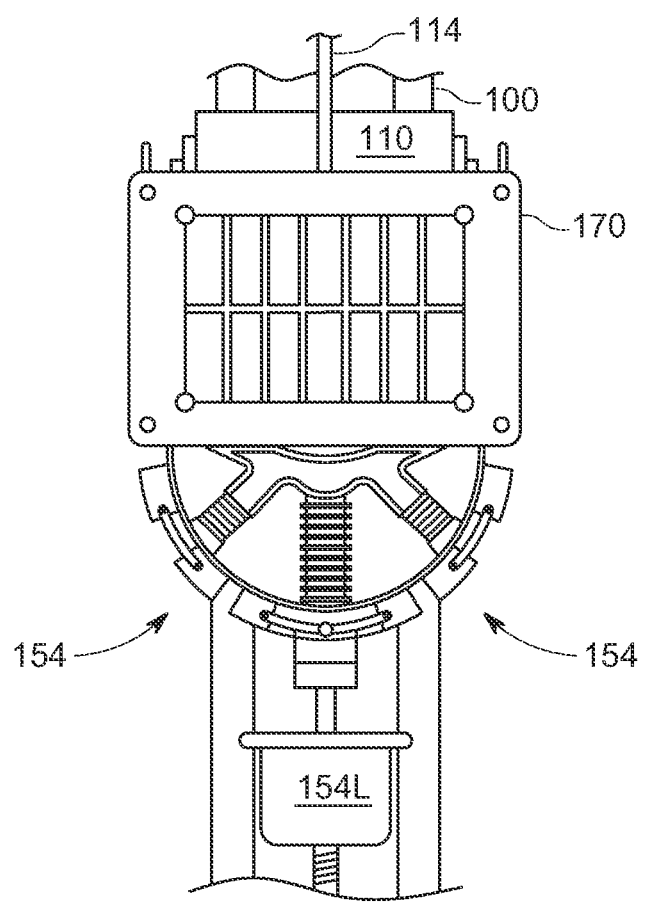
FIG. 5B shows a portion of a mast of the machine for driving foundation components and aligning and assembling trusses shown in FIG. 5A according to various embodiments of the invention.
Figure 5C:
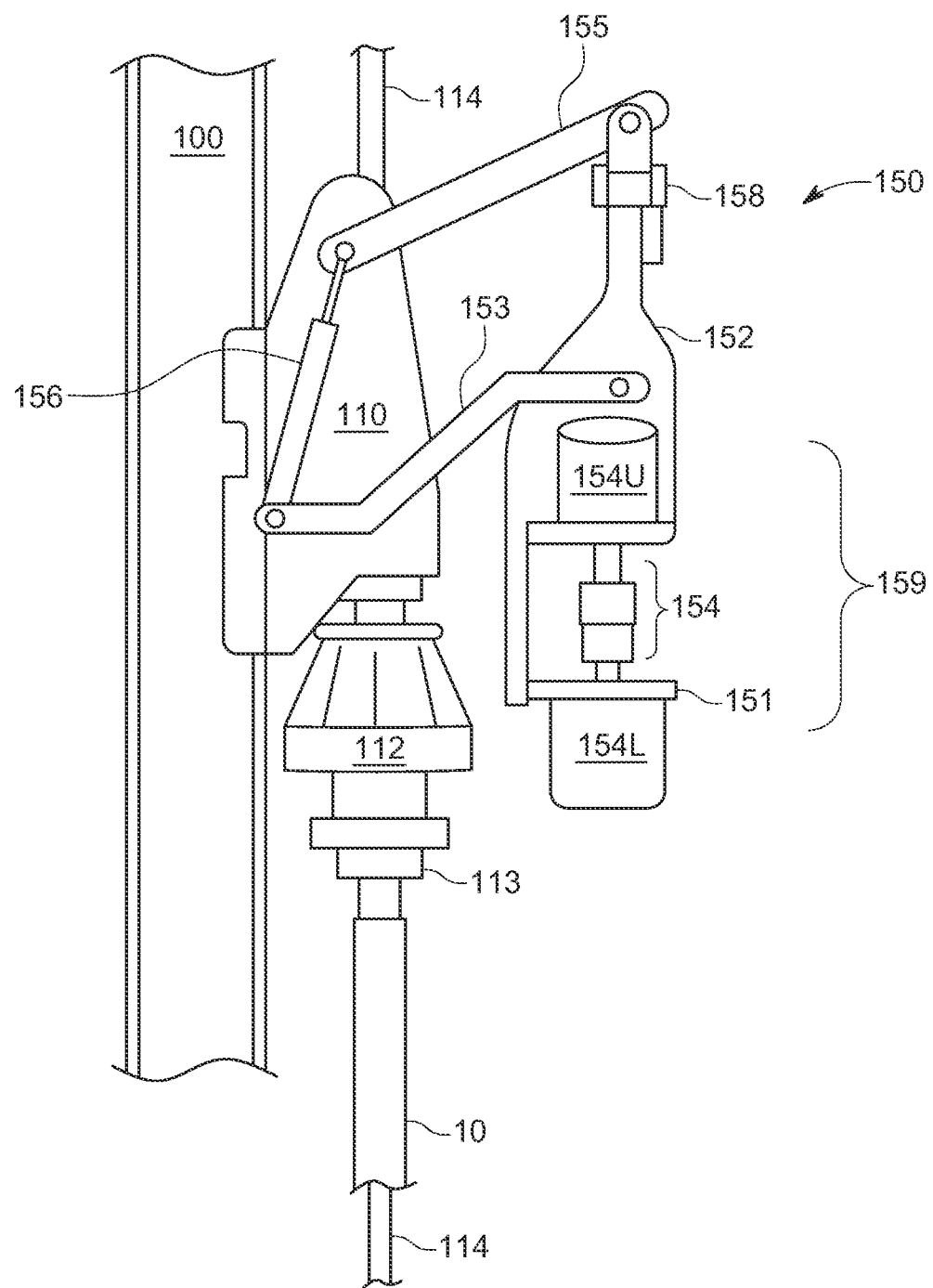
FIG. 5C shows a portion of the mast of the machine for driving foundation components and aligning and assembling trusses shown in FIG. 5A according to various embodiments of the invention.
Figure 5D:
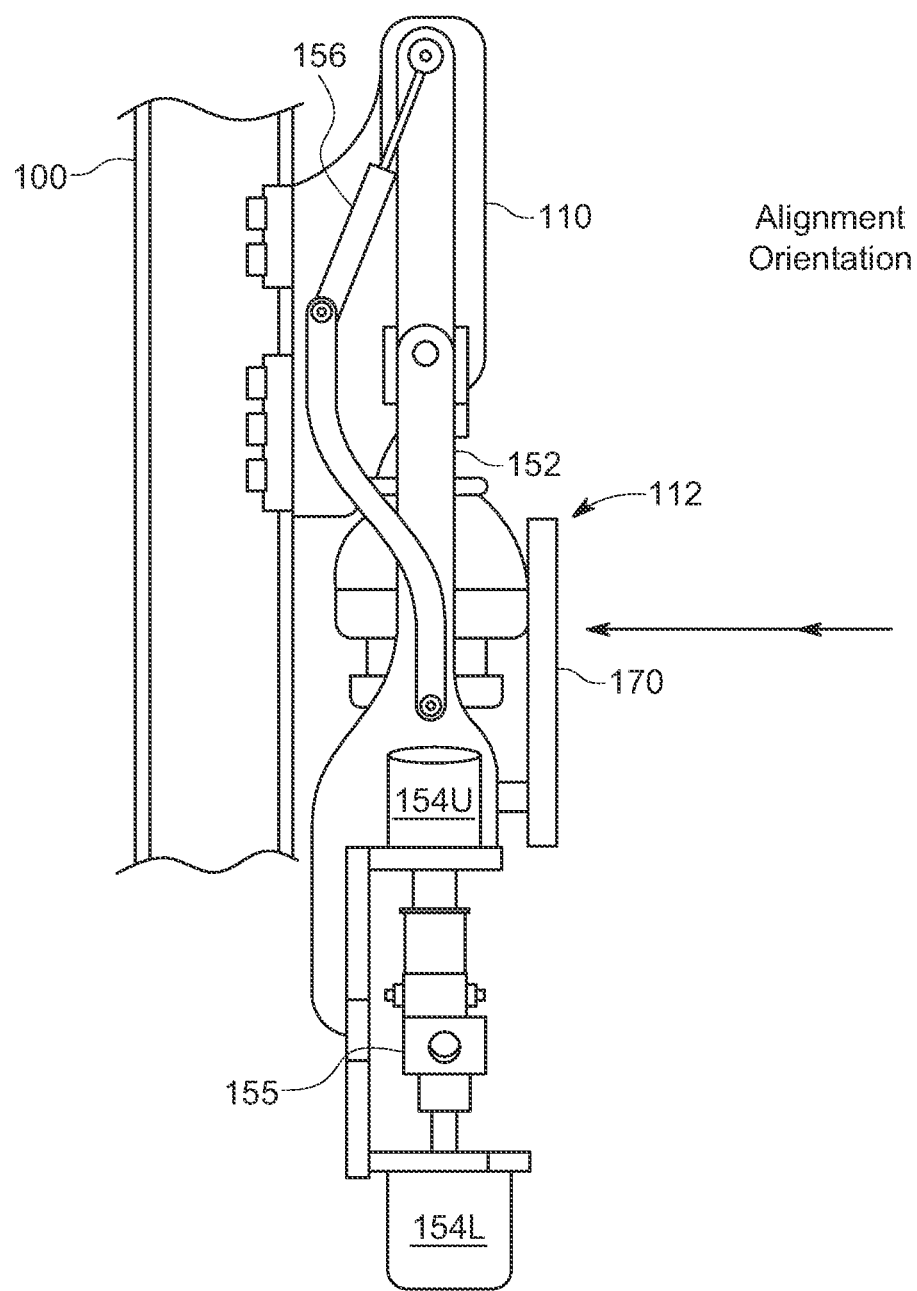
FIG. 5D shows a portion of the mast of the machine for driving foundation components and aligning and assembling trusses shown in FIG. 5A according to various embodiments of the invention.

In addition to alignment, assembly 150 is used to facilitate one or more automated crimping operations to assist in assembly of truss foundations. Assembly 150 consists of crimper subassembly 159 including lower frame member 151 and upper frame members 152 which, are generally orthogonal to one another, upper hydraulic cylinders 154U, lower hydraulic cylinder 154L, and mechanical crimp linkage 154M. In various embodiments, lower and upper frame members 151, 152 are attached to one another but are movable collectively with respect to lower crowd 110 via a four-bar linkage made of bent bars 153, straight bars 155 and actuators 156. When actuators 156 are retracted, frame assembly 150 moves out of the way of rotary driver 112 to the driving position, as seen in FIG. 5C.

Figure 6A:
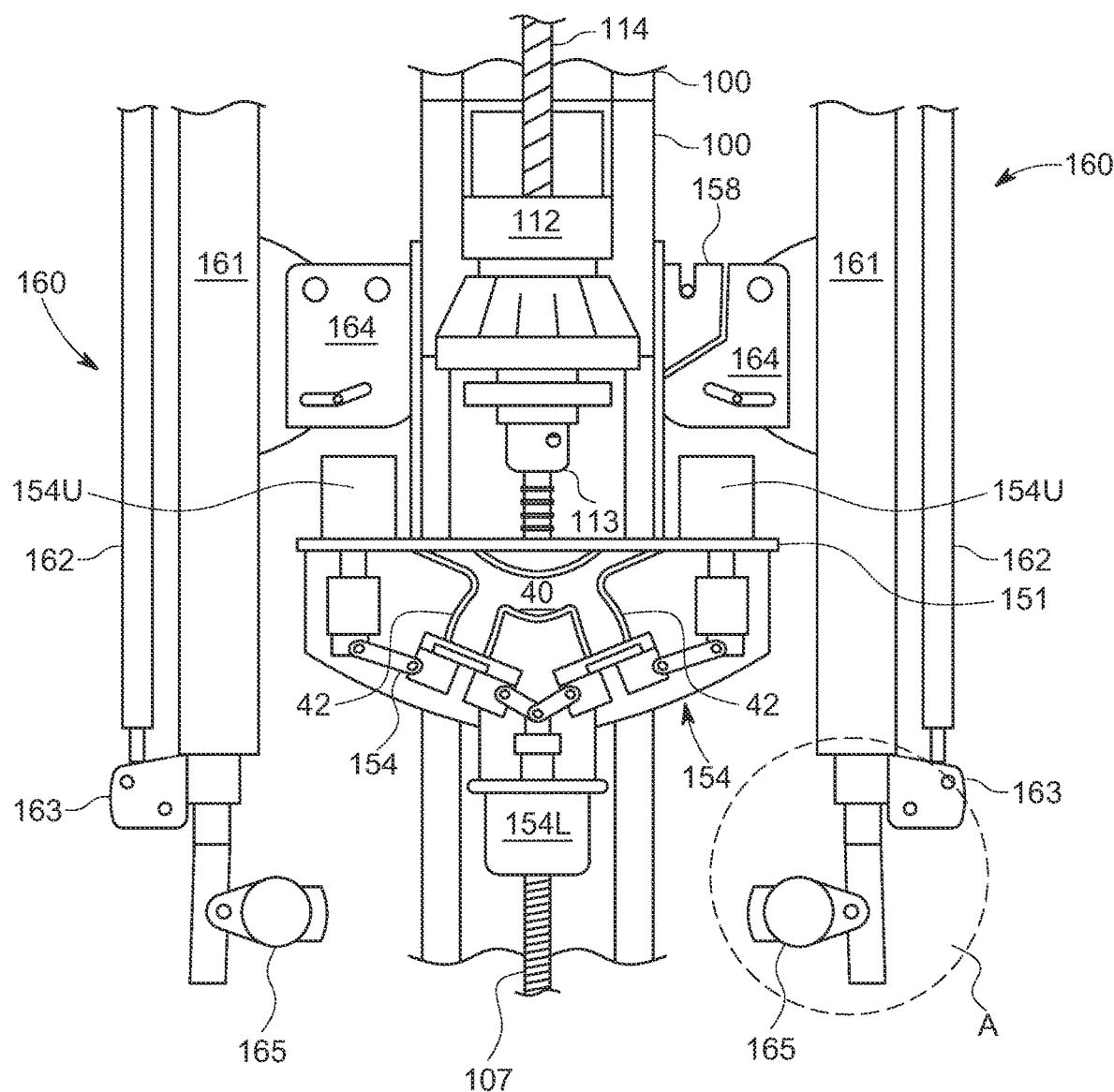
FIG. 6A shows a portion of the mast of the machine for driving foundation components and aligning and assembling trusses including upper and lower crimper assemblies according to various embodiments of the invention.
Figure 6B:
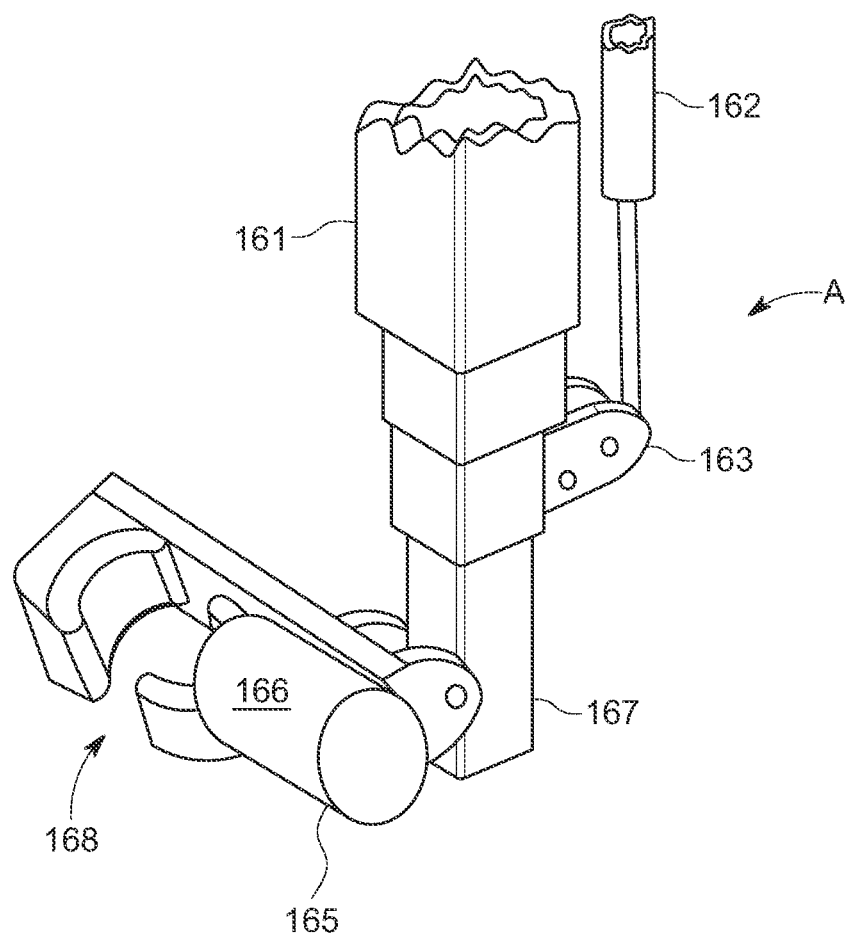
FIG. 6B is a partial close-up view of a portion a lower crimping assembly shown in FIG. 6A.
Figure 6C:
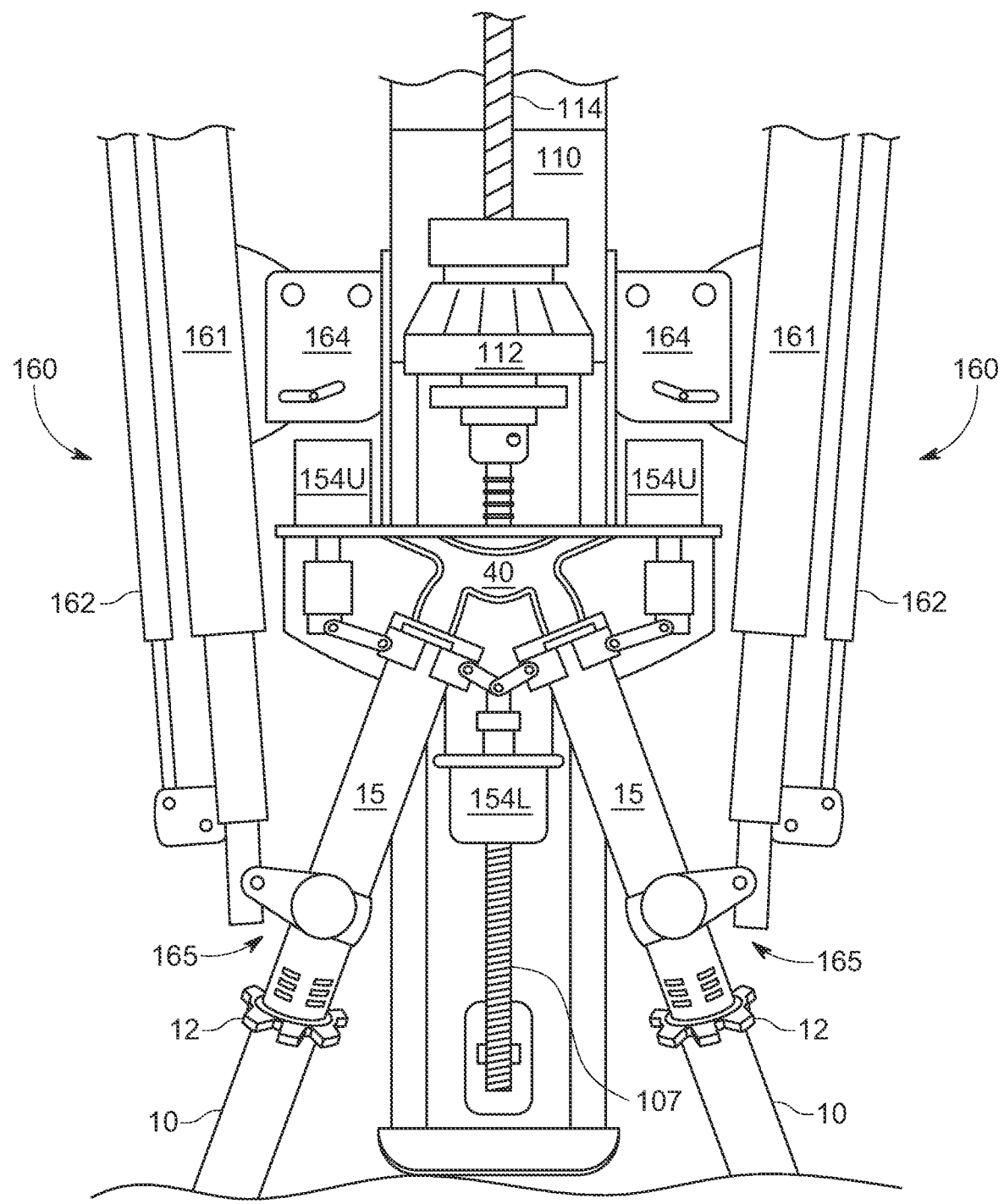
FIG. 6C shows a portion of the mast of the machine for driving foundation components and aligning and assembling trusses shown in FIG. 6A including upper and lower crimper assemblies according to various embodiments of the invention.

A detailed discussion of upper crimping assembly 159 is provided in the context of FIGS. 6A-C. Starting with 6A, this figure shows the same portion of mast 100 as in FIGS. 5A-D but with additional components of the upper and lower crimper assemblies added. Upper crimper assembly 159 is attached to frame member 151 and includes upper actuators 154U, lower actuator 154L and mechanical crimp linkage 154. In various embodiments, after truss cap 40 has been placed in the jig or holder adjacent frame member 151, and upper legs 15 have been sleeved over connecting portions 42, upper actuators 154U and lower actuator 154L are simultaneously energized to cause pressure to be applied to both sides of each connecting portion 42 via mechanical linkage 154, resulting in deformation of each upper leg 15 around each connecting portion 42.

A pair of second lower crimping assemblies 160 have been attached to brackets 158 via mounting plates 164. As shown in the figure, plates 164 consist of a two parallel plates joined together with pins. The first pin sits in the recess in bracket 158. The second pin provides a pivot that enables each arm 161 to pivot in plane, as seen for example, in 6C where arms 161 are tilted inward to enable lower telescoping crimpers 165 to engage the lower end of respective upper legs 20. In various embodiments and as shown, these assemblies 160 include telescoping arms 161 and linear actuators 162. The end of each linear actuator 162 is attached to a portion of one telescoping assembly 161 via bracket 163 to extend them as the actuators extend. Lower hydraulic crimping assembly 165 consisting of hinge bracket 167, actuator 166 and crimp opening 168, is attached to the distal end of each telescoping arm 161.

Figure 7:
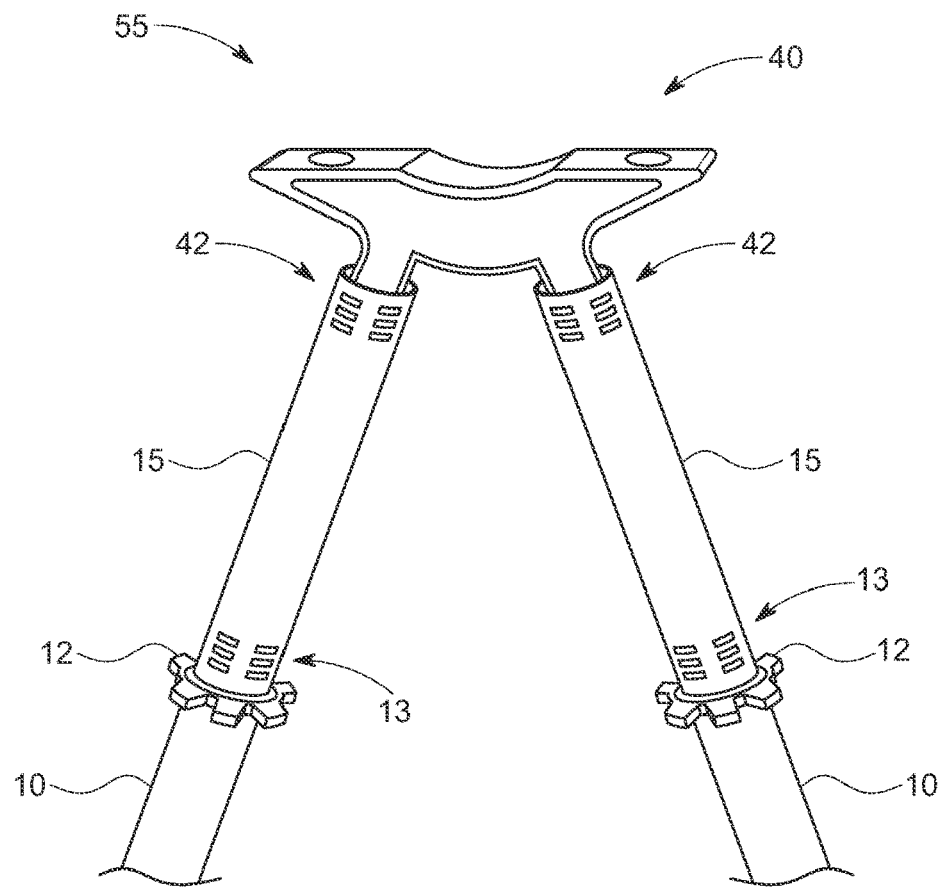
FIG. 7 is a truss foundation formed by the various structures and machines disclosed herein according to various embodiments of the invention.

In various embodiments, while assembly 150 is in the orientation position, truss cap 40 is loaded into the truss cap jig to be sandwiched between frame member 151 and mechanical linkage 154. At this orientation, connecting portions 42 are loosely captured within linkage 154 with sufficient clearance to allow an upper leg to be passed through the linkage and sleeved over each connection portion. At this position, upper crimping assembly 159 can be actuated to automatically make the upper crimp joints at the region of overlap between an upper leg and connection portions 42 of truss cap 40. At the same time or soon after, second crimping assemblies 160 may be actuated to cause actuators 162 to extend telescoping arms 161 until they contact upper legs 15. In various embodiments, assemblies 160 will pivot inward as they are extended to insure that they contact upper legs 15. Driving coupler 11 will function as a stop resulting in crimpers 165 being positioned at the correct location to make the lower crimp joints where each upper leg 15 overlaps with one of the driving couplers. When the crimp operations are complete, upper, and lower actuators 154U/L are retracted as are the actuators 166 at the end of each telescoping arm 161. Once each leg 15 has been released, actuators 162 are energized to retract telescoping arms 161 back to their retracted position. At this point, actuators 156 may be energized to move frame assembly 150 out the way so that the machine can be moved to the next foundation location, leaving behind fully assembled truss foundation 55, as seen in FIG. 7.

Figure 8:
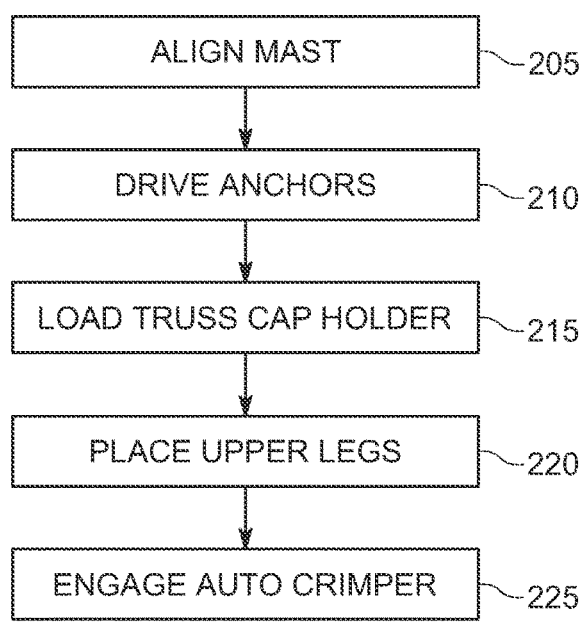
FIG. 8 is a flow chart detailing steps of a method for assembling a truss foundation such as that shown in FIG. 7 with the various structures and machines disclosed herein according to various embodiments of the invention.
Figure 9:
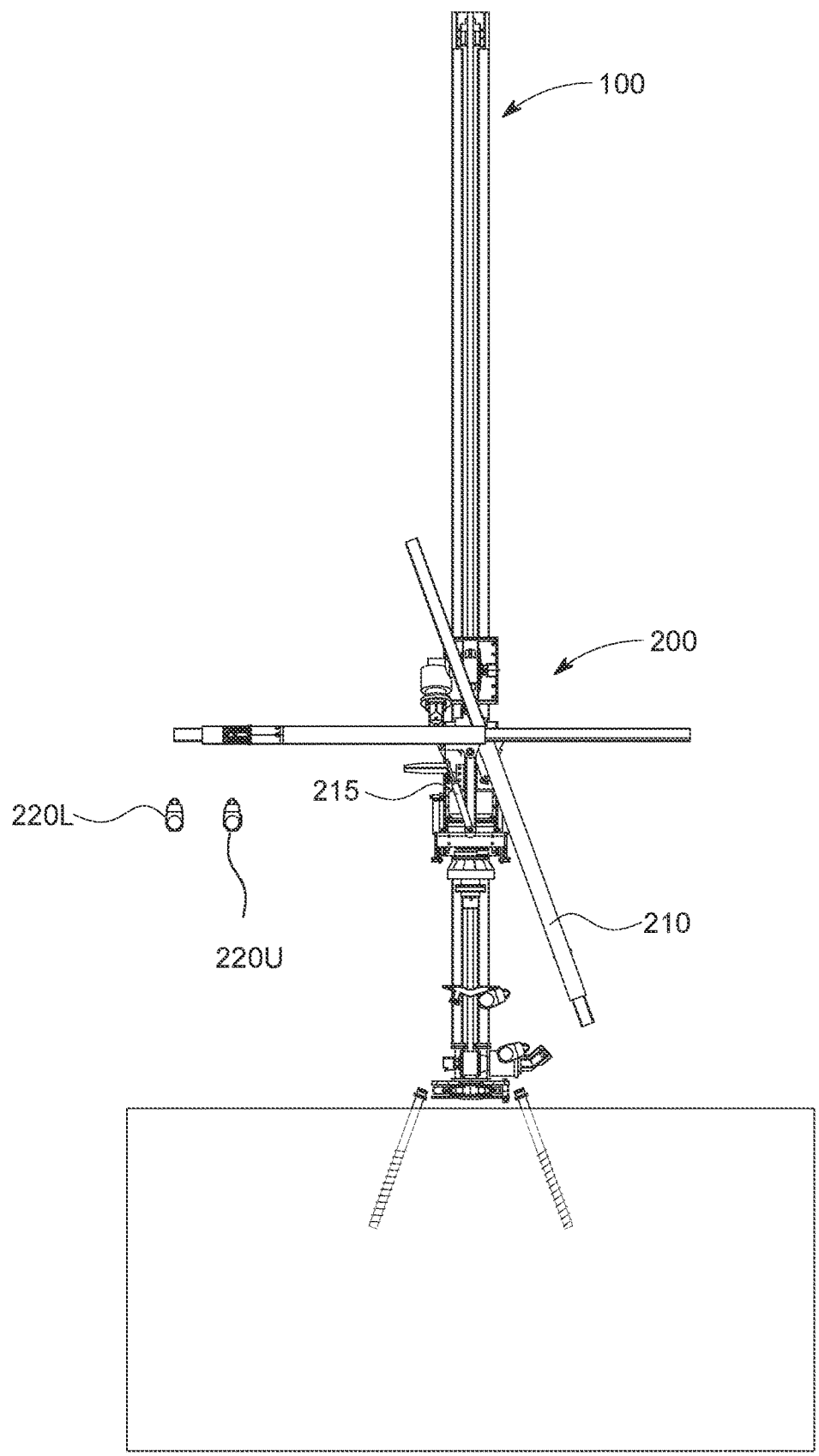
FIGS. 9-12 show different views of another automated crimping device usable with a machine for driving foundation components and assembling truss foundations according to various embodiments of the invention.
Figure 10:
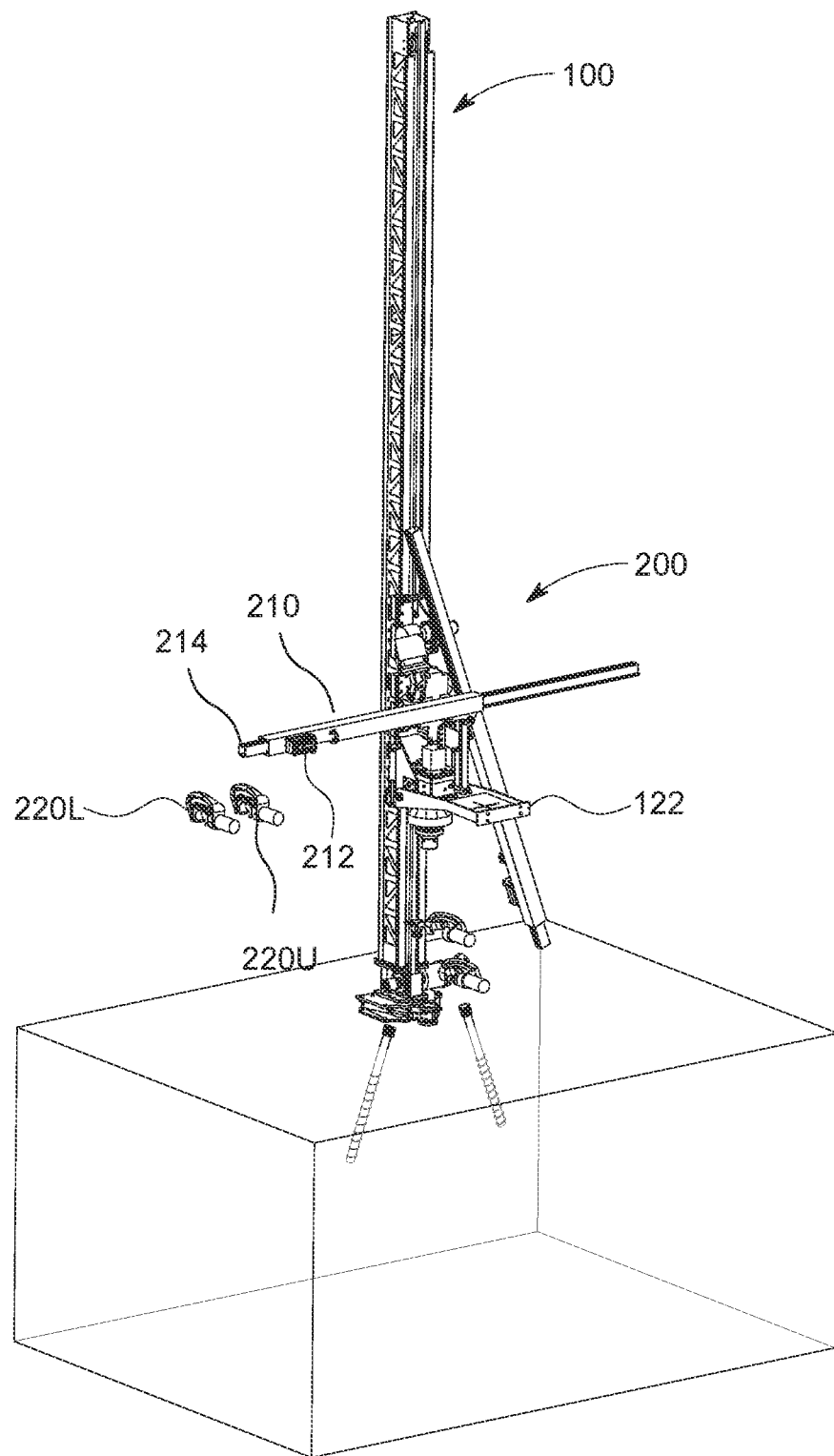
Figure 11:
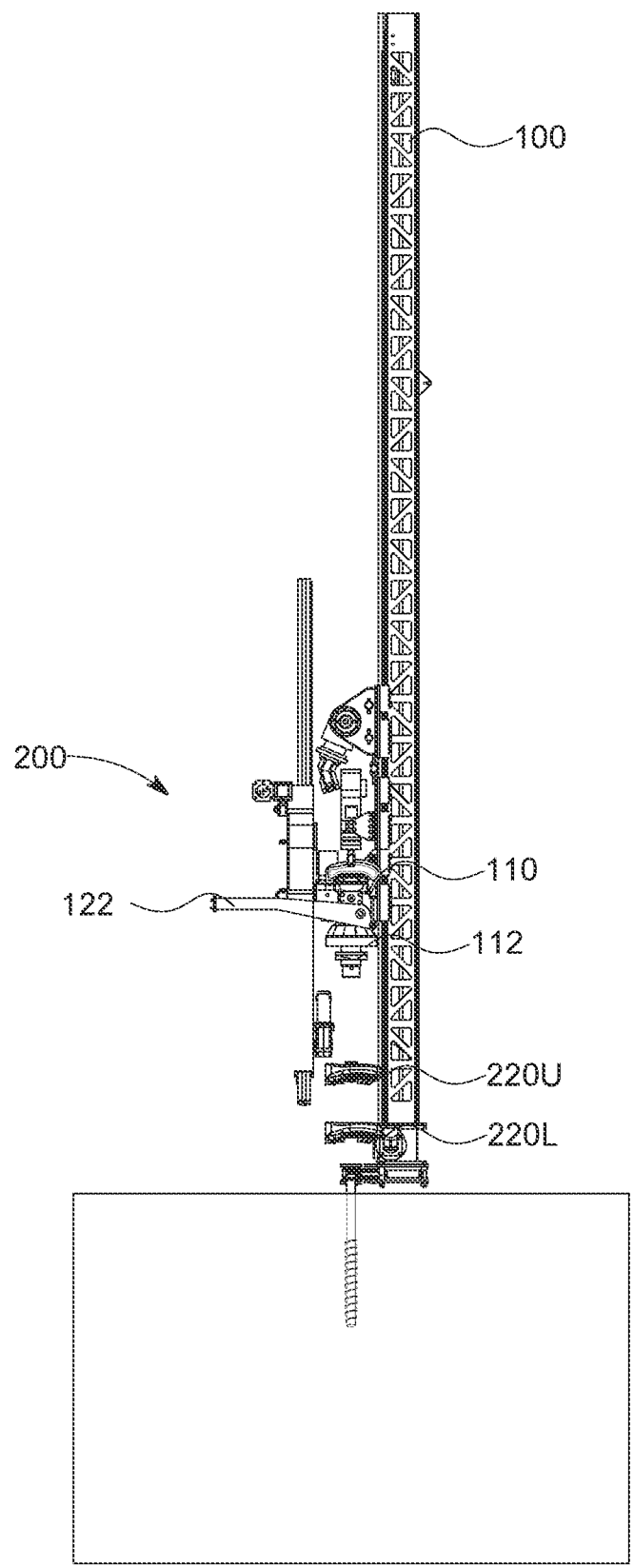

Turning now to FIG. 8, this figure is a flow-chart detailing the steps of a method for installing screw anchors and assembling a truss foundations with the various structures and systems show and described herein according to various embodiments. Staring in step 205, the mast is aligned. As discussed herein, this involves moving the machine so that it is generally aligned along an intended North-South line of the current tracker row. This may be accomplished with one or more global or local positioning systems. Alternatively, or in addition, the site may have been marked with flags or other indicators at the specific points along the row where each foundation should be located, and the machine is simply moved to be proximate one of those markers. In various embodiments, a frame assembly, such as assembly 120 in FIG. 4A/B or 150 in FIGS. 5A-D, 6A-C, will be moved into an alignment position where the center of the target is approximately aligned with the ideal center line through each leg or other suitable reference. Precise alignment may be achieved by illuminating one or more lasers at the end of the row to impinge on the target. Any micro adjustments in Y, Z and yaw may be made by an operator viewing the target. In various embodiments, leveling in pitch and roll are done automatically based on inclinometers readings. Also, as discussed herein, precise X-positioning may be done with one or more range finding lasers impinging on the back of the target. In various embodiments, an X-slide may be engaged to retract or withdrawal the mast along the line until the measured distance equals the correct distance from the range-finding laser.

When alignment is complete, the method advances to step 210 where a pair of screw anchors are driven. As described herein, this may consist of retracting the tool driver up the mast to provide access to the chuck of the rotary driver so that individual anchors may be driven sequentially. After the first screw anchor is loaded, the mast is automatically moved to the first driving angle. Through a combination of torque and downforce as well as assistance from the tool extending through the open lower end of the screw anchor, the first screw anchor is driven to the desired embedment depth, and entire assembly is retracted so that a second screw anchor may be loaded. The mast articulates to the second driving angle and the second anchor is driven via a substantially identical set of steps. Once the second anchor of the pair has been successfully driven, the driving assembly is withdrawn up the mast and the frame assembly is returned to the alignment orientation. At this position, in step 215, the truss cap is loaded onto the jig or truss cap holder. Ideally, the jig or truss cap holder positions the truss cap Y, Z, pitch, roll and yaw, precisely at the desired location to be consistent with other TRUSS CAPS in the same row within acceptable levels of tolerance.

In step 220, respective upper legs are threaded over the connecting portions of the truss cap and then lowered onto the driving collars at the above-ground end of each driven screw anchor. If the screw anchors are slightly off axis from the connecting portions of the truss cap, that is, the anchors do not point directly at them, the loose fit of the upper legs over the connection portions and driving couplers will take up this misalignment, allowing them to be joined into to form substantially straight legs. Then, in step 225, the automated crimper assembly is actuated to form the four required crimp joints. As discussed herein, in various embodiments, this consists of engaging a first crimp assembly to form a crimp joint around the intersection between each upper leg and one of the connection portions of the truss cap. At substantially the same time, second or lower telescoping crimping assemblies are actuated to extend down towards the lower end of each upper leg until the point where the leg terminates at one of the driving collars is reached. Respective crimpers at the end of each telescoping arm are energized to form respective lower crimp joints deforming the lower end of each upper leg around one of the driving collars. When crimping is complete, the actuators are retracted and the frame assembly is moved out of the way to the driving position so that the machine may simply be driven away, leaving behind the fully assembled truss. It should be appreciated that one or more manually controlled crimpers may be used in place of automated ones. Such crimpers, for example, may be attached to the mast or machine via a cable retractors so that it can be quickly moved into place without an operator having to support the full weight of the crimper.

Turning now to FIGS. 9-12, these figures shows different views of another crimping assembly for the mast of a machine for install screw anchors and assembling truss foundations according to various embodiments of the invention. Mast 100 is similar to that shown in FIGS. 4A and 4B with lower crowd 110 carrying rotary driver 112 and hinged frame assembly 120 with movable portion 122 containing a laser target that can be moved from an alignment orientation to a driving one. In addition, mast 100 shown in these figures includes automated crimping assembly 200. Assembly 200 consists of a pair of telescoping crimp arms 210 attached to lower crown 110 via actuator assembly 215. Assembly 215 includes at least one actuator that causes arms 210 to extend from a stowed position where they are away from the mast's drive axis to a crimping position where they are aligned with it.

During assembly, after a truss cap is loaded onto the jig or holder at the bottom of hinged target assembly 122, actuator(s) of assembly 215 may be controlled to extend causing arms 210 to scissor down to either side of mast 100. A pair of crimpers, 220L, 220U, on arms 210 are positioned to extend along the axis of a driven screw anchor to effect crimp joints between an upper leg and truss cap and between the upper leg and driving coupler at the upper end of each screw anchor. It should be appreciated that the brackets connecting lower crimpers 220L to telescoping portion 214 and upper crimpers 220U to crimp arms 210 have been intentionally omitted to provide clearance for other elements. It should be appreciated that these crimpers may be attached to their respective supporting portions, telescoping portion 214 and crimp arm 210, using any one of various brackets providing the correct geometry for the crimper with respect to the truss legs. In fact, these connections may be adjustable to allow for different truss leg angles, different truss caps, and different tracker maker assembly dimensions.

Figure 12:
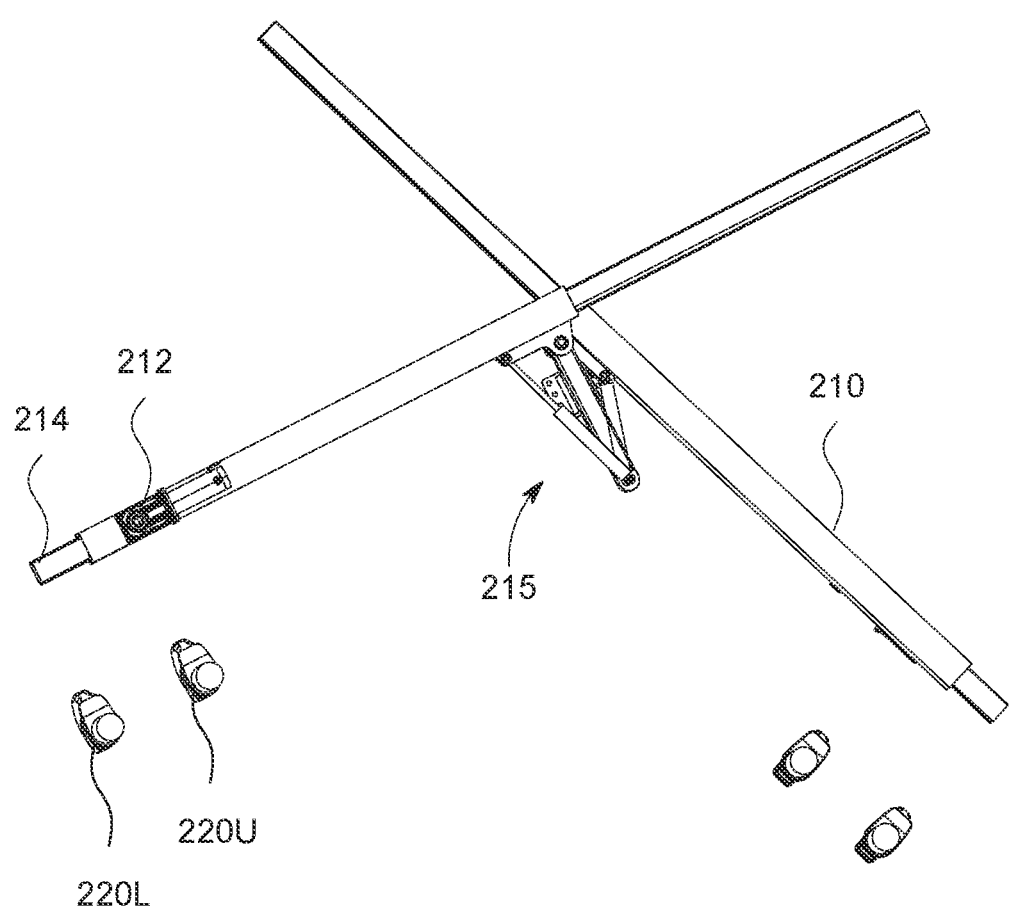

FIG. 12 shows dual crimp arm assembly 200 in isolation from the mast. As shown, each telescoping arm 210 is connected to the machine via actuator assembly 215. Respective hydraulic actuators are controllable to extend and retract, thereby moving arms 210 between a stowed and in-use position. It should be appreciated that a gear or other linkage may enable a single actuator to move both arms 210 into and out of the crimping position. After a truss foundation has been loosely assembled with the truss cap aligned at the desired orientation vis-à-vis via laser reference. the automated crimping system activated to begin the crimping operation. This may cause one or both hydraulic actuators to extend, swinging each arm down so that it is aligned parallel with a respective one of the truss legs. In various embodiments, each arm has an upper crimper 220U that is movable but fixed to the arm. In other words, it can be moved to different positions along the arm to set the machine up for the geometry of the truss cap used at the current job, but it does not move independent of the arm during a crimping operation. Each arm also has a telescoping portion 214 that is controllable to extend or retract relative to arm 210 along substantially the same axis. In various embodiments, a second, lower crimper 220L is located proximate to a distal end of each telescoping portion 214. In various embodiments, the telescoping portion will slide inside of its arm when fully retracted and will project out of the arm when fully extended. In the example of these figures, this is accomplished with motor 212 mounted proximate to the end of each arm 210. In various embodiments, the output shaft of this motor turns a pinion gear that engages a rack formed in telescoping portion 214, however, other mechanisms are also possible.

In various embodiments, when each arm 210 swings down it stops when one of the assembled upper truss legs is captured in the opening of the jaws of the upper crimper 220U. In various embodiments, upper crimpers 220U may be positioned along the arm at a precise distance relative to the arm's point of rotation so that when they are swung down into place, the open jaws of each upper crimper 220U captures the upper leg at precisely the portion that overlaps with the connecting portion of the truss cap. This distance may vary depending on which tracker maker's hardware will be used but is known in advance. At the same time, the jaws of each lower crimper 220L will also be positioned around one of the upper legs. Then, as upper crimpers 220U are actuated to form respective crimp joints, telescoping portion 214 may be extended a known distance down the leg or until they bottom out against respective ones of the crimp collars 12. Then, lower crimpers 220L may be actuated to crimp the portion of each upper leg overlapping with the screw anchor driving collar. In various embodiments, extension, and retraction of telescoping portions 214 happens by motors 212 on each arm that turn a pinion gear that in turn pushes against a rack formed on a surface of the telescoping portion. When all crimping operations are complete, the crimp jaws return to their relaxed, open positions, the telescoped portions are retracked back into their respective arms and the arms are returned to the stowed position via the one or more hydraulic actuators controlling their movement.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A movable target assembly for a mast of a screw anchor driving machine, the target assembly comprising:
   a target portion;
   a jig portion for holding a foundation component to be crimped above a pair of screw anchors driven by the machine; and
   a first crimping portion operable to simultaneously form crimp connections between a pair of upper truss leg sections and the foundation component held by the jig portion, wherein the target portion, jig portion and first crimping portion are attached to a first movable assembly that is operable to move with respect to the mast from a first alignment orientation in the path of a rotary driver on the mast to a second driving orientation offset from the path of the rotary driver.

2. The target assembly according to claim 1, wherein the first alignment orientation and second driving orientations are both parallel to the mast.

3. The target assembly according to claim 1, wherein the first crimping portion comprises at least one first hydraulic crimping device that is operable to simultaneously effect the crimp connections between the foundation component supported by the jig portion and upper ends of the upper truss leg segments.

4. The target assembly according to claim 1, further comprising a second movable assembly operable to travel along the mast, the second movable assembly having the rotary driver thereon, wherein the first movable assembly is attached to the second movable assembly.

5. The target assembly according to claim 4, further comprising a second crimping portion comprising a pair of telescoping arms attached to opposing sides of the second movable assembly, each telescoping arm terminating in a second hydraulic crimping device.

6. The target assembly according to claim 5, wherein each telescoping arm and hydraulic crimping device is controllable to extend along one of the upper truss leg sections to affect a crimp joint between a lower end of the upper truss leg section and an upper end of a driven screw anchor.

\* \* \* \* \*